United States Patent [19]

Wilson et al.

[11] Patent Number: 5,596,881
[45] Date of Patent: Jan. 28, 1997

[54] PICK-UP TUBE ATTACHMENT TECHNIQUE

[75] Inventors: Tom C. Wilson, Booneville; Howard Sims, Rienzi, both of Miss.

[73] Assignee: Parker-Hannifin Corporation, Cleveland, Ohio

[21] Appl. No.: 392,462

[22] Filed: Feb. 22, 1995

[51] Int. Cl.$^6$ .......................... F25B 43/00; B21D 39/00; B23P 11/00

[52] U.S. Cl. ..................... 62/503; 62/474; 29/509

[58] Field of Search ............................. 62/509, 474, 512, 62/503; 137/514; 29/509, 523; 55/316, 391

[56] References Cited

U.S. PATENT DOCUMENTS

| | | | |
|---|---|---|---|
| 3,930,298 | 1/1976 | Ridenour | 29/523 |
| 4,024,888 | 5/1977 | Jacyno | 137/514 |
| 4,118,323 | 10/1978 | Sugiyama et al. | 210/439 |
| 4,200,314 | 4/1980 | Ridenour | 285/382.5 |
| 4,291,548 | 9/1981 | Livesay | 62/503 |
| 4,450,618 | 5/1984 | Ridenour | 29/509 |
| 4,496,378 | 1/1985 | Kish | 55/316 |
| 4,707,999 | 11/1987 | Ohta et al. | 62/474 |
| 4,920,766 | 5/1990 | Yamamoto et al. | 62/474 |
| 5,048,309 | 9/1991 | Carlisle, Jr. | 62/503 |
| 5,087,085 | 2/1992 | McGarvey | 285/328 |
| 5,172,939 | 12/1992 | Hashimoto | 285/24 |
| 5,191,775 | 3/1993 | Shiina et al. | 62/503 |
| 5,247,813 | 9/1993 | Bottum | 62/503 |

Primary Examiner—William Doerrler

[57] ABSTRACT

A refrigerant assembly includes a refrigerant housing for receiving and containing refrigerant. In one embodiment, the housing has an upper end cap extending over and covering an open upper end of the housing to define a central cavity for the refrigerant. The upper end cap has a bore extending from an inner surface of the end cap to the outer surface. A pick-up tube extends inwardly into the bore from the inner surface of the end cap and is dimensioned so as to be closely received therein. The pick-up tube includes an annular bead toward its outlet end which is received within a counterbore formed coaxial with the bore from the inner surface of the end cap. The counterbore is dimensioned to closely receive the bead on the pick-up tube. The inner surface of the end cap surrounding the counterbore is then mechanically deformed, preferably by staking, around the entire circumference of the pick-up tube such that end cap material is forced radially inward toward the tube. The end cap material at least partially encloses the pick-up tube bead within the counterbore to secure the pick-up tube to the end cap. Moreover, a sharp edge between the counterbore and bore is forced against the junction between the bead and the pick-up tube to provide a fluid tight seal.

22 Claims, 3 Drawing Sheets

PICK-UP TUBE ATTACHMENT TECHNIQUE

FIELD OF THE INVENTION

The present invention relates generally to attaching a fluid tube to the end cap or wall of a container, and more particularly to attaching a pick-up tube to the end cap or side wall of a refrigerant receiver.

BACKGROUND OF THE INVENTION

There are numerous techniques known for attaching a fluid tube to the wall or end cap of a container such that fluid can be introduced into or directed out of the container. One common technique is to insert the tube through a hole in the wall or end cap and secure the tube such as by soldering, welding, or brazing. This technique is shown in U.S. Pat. Nos. 4,496,378 and 5,048,309. Another technique is to form the tube in the bore such as by outwardly deforming the tube (i.e., swaging). This technique is shown in U.S. Pat. Nos. 4,496,378, 4,291,548 and 4,118,323. A still further technique is to machine the surface of the end cap or wall around the tube bore to provide a collar. The tube is then inserted within the bore, and the collar is coined or crimped inwardly against the tube to secure the tube. This technique is shown in U.S. Pat. No. 4,707,999. This latter technique has become accepted in the refrigeration industry for attaching a pick-up tube to the end cap or wall of a receiver housing. The pick-up tube extends inwardly from the inside, inlet opening of the end cap or wall to draw liquid refrigerant from the receiver.

In certain situations, and in particular in a refrigerant receiver, it is also necessary that a fluid-tight connection be achieved between the tube and the end cap or wall. As such, it is known to form an annular bead on the end of the tube, and locate the bead within a counterbore formed in the end cap or wall. An O-ring type seal is disposed between the bead and the shoulder to fluidly seal the tube in the bore. The tube is then secured to the end cap or wall using one of the techniques described above. This sealing technique is also shown in U.S. Pat. No. 4,707,999, as well as in U.S. Pat. No. 5,191,775.

While the above techniques can be useful in certain situations to attach a tube to a end cap or wall of a container, they are not without drawbacks. For example, in attaching a pick-up tube to an end cap or wall of a refrigerant receiver, machining away the inside surface of the end cap or wall to provide a collar results in wasted material. Crimping or coining the collar into engagement with the tube also requires time and additional machining steps. With aluminum end caps, this technique also typically requires the tube to be attached along or near the center-line of the end cap, such that break-through of the end cap is avoided. Forming the bore at the center-line of the end cap, however, limits the potential applications for the receiver. For example, in some situations it is desirable to mount a plurality of components to the top surface of a receiver end cap. If the pick-up tube bore is formed at or near the center-line of the end cap, the number of additional components mounted to the end cap can be limited. While it is known to form the outlet opening for the bore off-center on the end cap, cross holes must then be drilled transversely through the end cap to connect the outlet opening to the inlet opening along the centerline, and appropriate plugging is then necessary. This further increases the machining steps, labor costs, and wasted material.

Finally, providing an additional O-ring type seal within the bore to provide a leak-tight arrangement further increases material costs, machining steps, and consequently, the overall cost of the refrigerant receiver.

Thus, it is believed that there is a demand in the industry for an effective technique for attaching a fluid tube to the end cap or wall of a container which reduces material waste and machining steps, and provides a fluid-tight seal without an additional O-ring type seal.

SUMMARY OF THE INVENTION

The present invention provides a new and unique technique to attach a fluid tube to the end cap or wall of a container, and more particularly provides a fluid-tight connection between the pick-up tube and the end cap or wall of a refrigerant receiver. The technique reduces machining steps, does not require removal of material from the end cap or wall to attach the tube, and does not require an additional O-ring type seal for providing a fluid tight connection between the tube and the end cap or wall.

According to the present invention, the pick-up tube includes an annular bead formed proximate the end of the tube. The end cap or wall includes a bore which is dimensioned so as to closely receive the end of the tube. The bore includes a counterbore extending outwardly to the surface of the end cap or tube. The counterbore is dimensioned so as to closely receive the bead on the pick-up tube. The counterbore and bore define an annular shoulder with an inner sharp edge which engages the junction between the bead and the end of the tube when the tube is inserted within the bore.

The pick-up tube is attached to the end cap or wall by forcing a die against the surface of the end cap or wall surrounding the bore and mechanically deforming (staking) the end cap or wall material inwardly against the bead. The end cap or wall is formed entirely around the bead and almost entirely encloses the bead within the counterbore. The staking operation causes the sharp shoulder in the bore to be forced against the junction between the bead and the end of the tube to provide a fluid tight connection.

The end cap or wall with attached pick-up tube can then be incorporated into a receiver housing assembly and installed in a refrigeration system, as is known in the art.

The present invention thereby provides a simple technique for providing a connection between a fluid tube and an end cap or wall of a container. The connection is fluid-tight and is provided in essentially a single machining (staking) step which does not waste end cap or wall material. The staking step can be performed across almost the entire surface of an end cap, which increases the potential locations for positioning the pick-up tube, and thereby allows additional components to be mounted to the top surface of the end cap, as necessary.

Further features and advantages of the present invention will become apparent upon reviewing the following specification and accompanying drawings.

DETAILED DESCRIPTION OF THE PREFERRED EMBODIMENT

Figure 2:
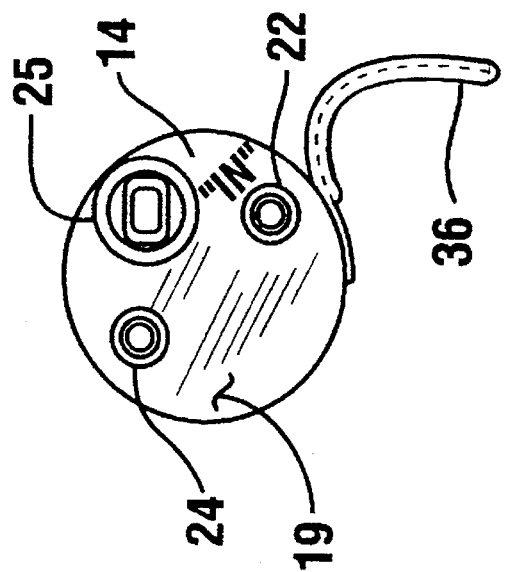
FIG. 2 is a top end view of the refrigerant receiver of FIG. 1.
Figure 1:
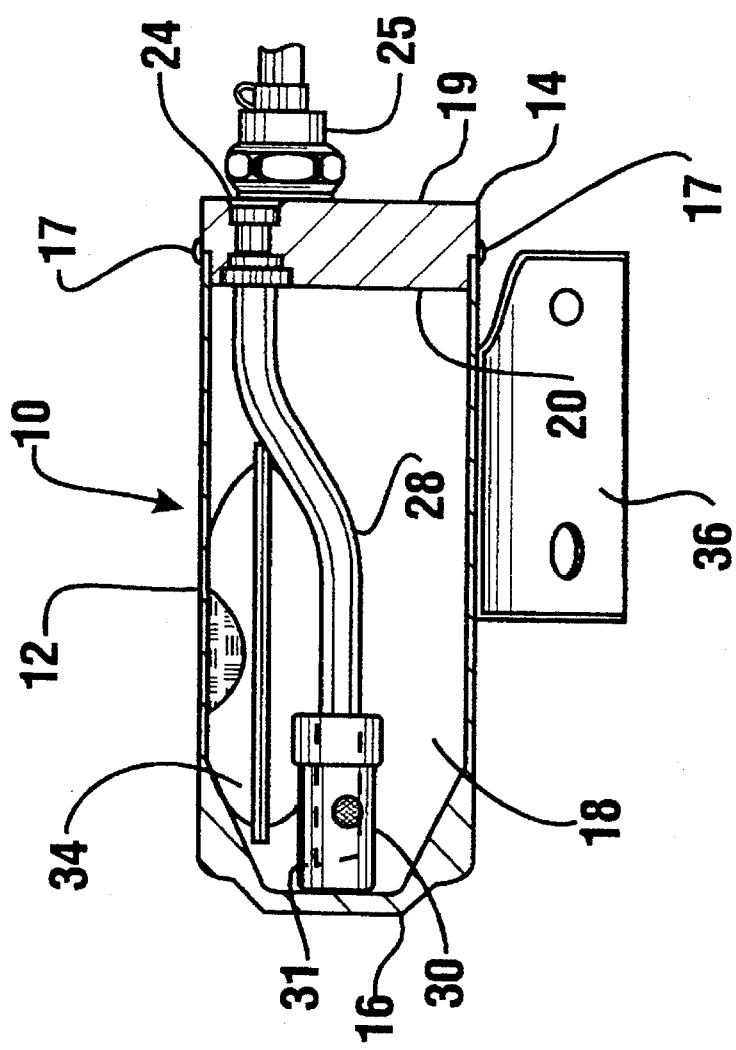
FIG. 1 is a cross-sectional side view of a refrigerant receiver with a pick-up tube-end cap connection constructed according to the principles of the present invention.

Referring to the drawings, and initially to FIGS. 1 and 2, a fluid container constructed according to one embodiment of the present invention is indicated generally at 10. The container 10 preferably comprises a refrigerant receiver which is designed to accumulate, store and dry refrigerant within a refrigeration system, although the principles of the present invention are also applicable to other types of fluid containers as should be apparent to those skilled in the art upon reading the following description.

In any case, the container 10 includes a cylindrical housing or can 12 with upper and lower end caps 14, 16. Lower end cap 16 is preferably formed in one piece with housing 12, while upper end cap 14 is preferably formed as a separate piece and attached thereto such as by welding or brazing at 17. Housing 12 and upper and lower end caps 14, 16 are preferably formed from aluminum (type 6061-T6) material, and define a central fluid cavity 18. Upper end cap 14 has a flat upper surface 19, a flat lower surface 20, and inlet and outlet ports 22, 24, respectively, which extend through the upper end cap and direct refrigerant into and out of the container 10. The outer end of inlet port 22 can be externally connected to a liquid line or conduit from, e.g., an evaporator (not shown), while the outer end of outlet port 24 can be externally connected to, e.g., a compressor (also not shown). Refrigerant flows into the refrigerant receiver through inlet port 22 and is drawn out through outlet port 24. A pressure sensor 25 (and other components) can also be mounted to the upper surface of end cap 14 as required.

An internal pick-up tube 28 is disposed within fluid cavity 18 and extends to the inner end of outlet port 24. Pick-up tube 28 is preferably formed from aluminum (type 3003) material and includes a screen 30 at its lower inlet end 31 which is designed to filter out particles in the refrigerant as the refrigerant is drawn through outlet port 24. Appropriate desiccant material 34 is located within the cavity 18 of the receiver to remove any water (or oil) within the refrigerant. While the desiccant material is illustrated as being included in a single pouch, the desiccant material can also be formed in a plurality of stacked "donuts" with a central opening for the pick-up tube (see e.g., U.S. Pat. No. 5,215,660). Finally, a bracket 36 is welded to housing 12 and enables the receiver 10 to be secured at an appropriate location within the refrigeration system. The various components of the refrigerant receiver to the extent described above are well known to those skilled in the art and are constructed using conventional materials following known techniques. Again, the refrigerant receiver is only one exemplary type of fluid container which can be used with the principles of the present invention.

Figure 3:
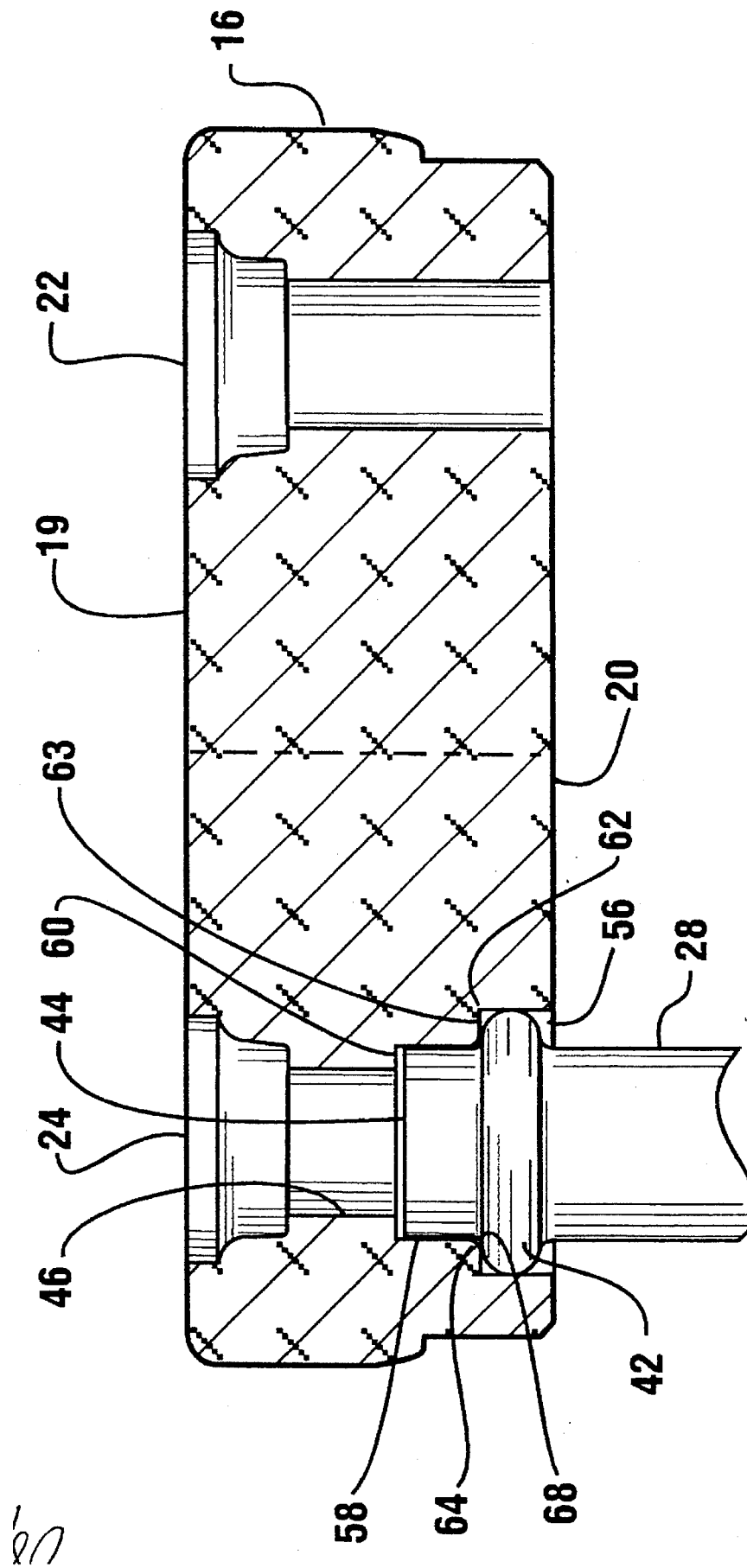
FIG. 3 is a schematic cross-sectional, side view of the end cap for the refrigerant receiver of FIG. 1, showing the pick-up tube located within the bore of the end cap during an initial step of assembly.
Figure 4:
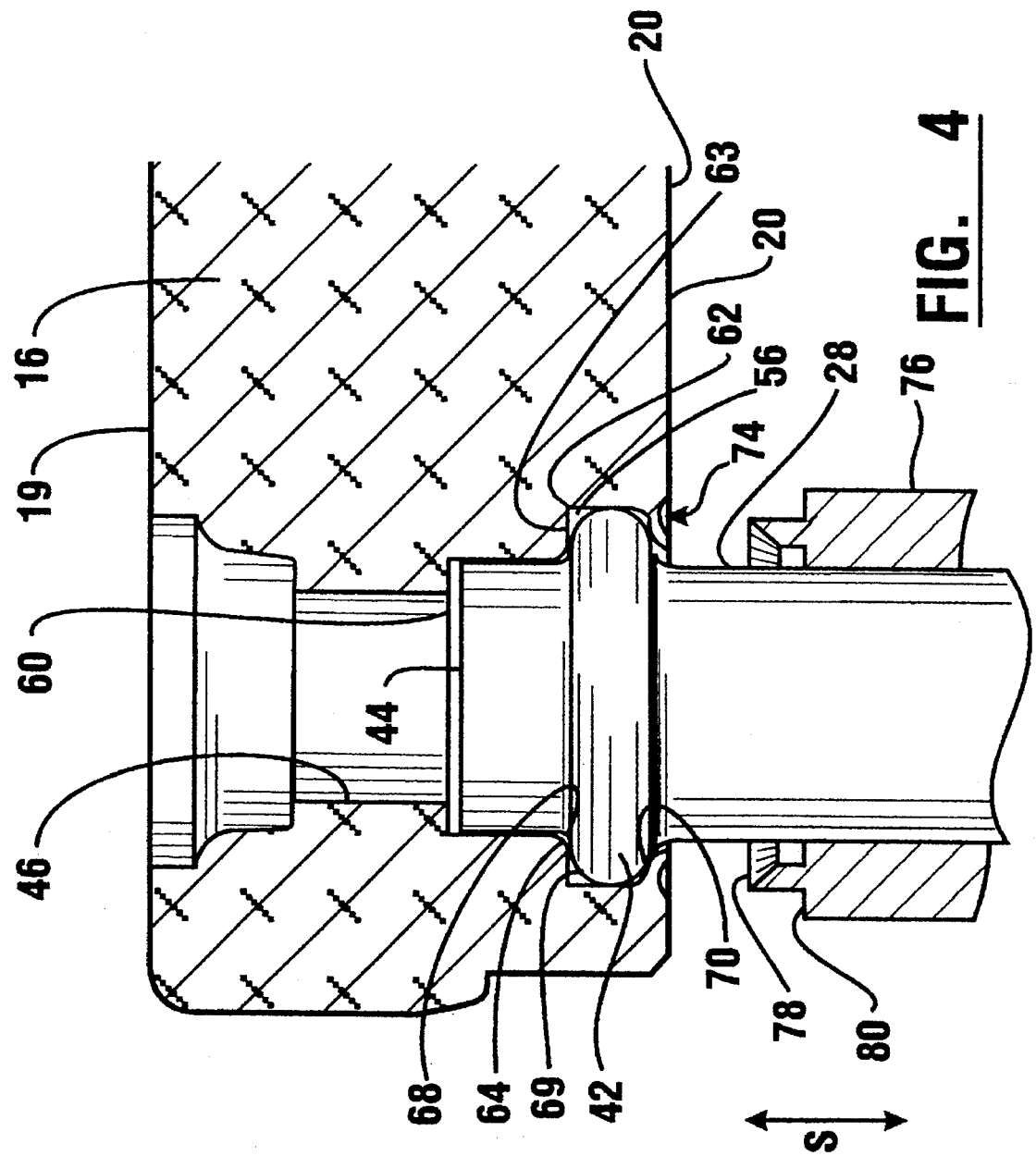
FIG. 4 is a view similar to a portion of FIG. 3, showing a further machining step for attaching the pick-up tube to the end cap of the refrigerant receiver.

Referring now to FIGS. 3 and 4, the pick-up tube 28 includes an annular bead or bulge 42 located proximate the outlet end 44 of the tube and extending transversely to the longitudinal axis of the tube. Although the bead 42 is illustrated as being spaced a short distance from the outlet end of the tube, the bead could also be formed directly at the outlet end. The bead 42 can be formed using techniques which are conventional in the art, for example the bead can be formed by an end-forming machine. The end plate 16 includes a longitudinally extending bore 46 for receiving tube 28. Bore 46 extends from the upper surface 19 to the lower surface 20 of end cap 16, and has a configuration which closely receives tube 28. Specifically, bore 46 includes a first (co-axial) counterbore 56 which extends inwardly into the end cap from the lower surface 20. Counterbore 56 has an inner surface dimension which is substantially the same as the outer dimension of bead 42 on pick-up tube 28, such that bead 42 can be closely received within counterbore 56. Counterbore 56 preferably extends axially into end cap 16 from lower surface 20 an amount which is slightly greater than the axial width of tube bead 42. Bore 46 also preferably includes a second (co-axial) counterbore 58 extending inwardly from the first counterbore 56 from the lower surface 20. Counterbore 58 has an inner surface dimension which closely receives the outlet end 44 of the pick-up tube 28. The outlet end 44 of pick-up tube 28 preferably abuts or is closely proximate to the annular shoulder 60 formed between second counterbore 58 and bore 46. The techniques for forming bore 46 and counterbores 56 and 58 in end cap 16 should be well known to those skilled in the art.

An annular shoulder 62 is defined between first counterbore 56 and second counterbore 58. Shoulder 62 includes a substantially flat surface 63 facing axially outward (downwardly in FIG. 3) and extending between counterbore 56 and counterbore 58. Surface 63 preferably extends at right angles to counterbore 56 and counterbore 58, although surface 63 could be formed at an acute angle to both counterbore 56 and counterbore 58 to create a wedge-shaped annular lip. In any case, shoulder 62 has a sharp annular edge 64 at the juncture of flat surface 63 and counterbore 58. Edge 64 has a sharper radius than the radius of the junction 68 between the upper surface 69 of tube bead 42 (FIG. 4) and the end 44 of pick-up tube 28. Preferably, the radius of convex edge 64 is about 5/1000 while the radius of the concave junction 68 is at least 20/1000. When pick-up tube 28 is inserted axially into bore 46 (from lower surface 20), edge 64 is forced against junction 68 around the entire circumference of bead 42.

As shown in FIG. 4, the lower surface 20 of end cap 16 surrounding counterbore 56 is mechanically deformed to tightly attach pick-up tube 28 to the end cap 16. Preferably, the lower surface material is forced radially inwardly toward the tube and against outer surface 70 of bead 42. The deformed surface material, indicated generally at 74, substantially encloses bead 42 within the counterbore 56 around the entire circumference of the tube. The robe is retained tightly within the bore such that wobbling of the robe is prevented. Also, the mechanical deforming of the lower surface forces the bead upwardly within the bore such that the sharp annular edge 64 in the end cap is forced against junction 68 on tube 28. Because of the sharpness of edge 64 and the slightly harder temper of the end cap, the edge 64 of the end cap "bites," "cuts" or "indents" into the robe junction 68 such that a fluid-tight seal is provided between end cap 16 and the entire circumference of tube 28. This seal is sufficient to prevent fluid from seeping between the tube and end cap without the need for an elastomeric O-ring type seal.

The means for mechanically deforming the lower surface 20 of end cap 16 against bead 42 of pick-up tube 28 preferably comprises a die tool 76 which is received around the pick-up tube 28 and is then forced against the end cap material surrounding counterbore 56. The die 76 preferably includes an annular, wedge-shaped, carbon-tipped forward or striking head 78 which bites into the end cap and forces the end cap material radially inward toward the pick-up tube 28. The die deforms ("stakes") end cap material 360° around the entire periphery of tube 28. A space of at least about $200/1000$ inch is maintained between first counterbore 56 and the periphery of end cap 16 for strength reasons. Preferably, a single forward and return stroke (schematically represented by the arrows "S") are used to stake the end cap to the pick-up tube. Preferably, the die applies about 1250 lbs. of pressure against the end cap. Die 76 can be incorporated within a conventional hydraulic or pneumatic cylinder assembly to affect the proper axial motion, as should be well known to those skilled in the art. After the die 76 finishes its return stroke and is removed from around pick-up tube 28, the pick-up tube can then be bent as appropriate so as to provide room for the other components in the receiver housing, such as the desiccant material (see, e.g., FIG. 1).

After pick-up tube 28 is attached to end cap 16 and bent as appropriate, end cap 16 can be secured to housing 12 (e.g., welded or brazed) to complete the assembly of the refrigerant receiver housing.

While the above preferred embodiment of the present invention describes a pick-up tube attached to an end cap of a refrigerant receiver, the present technique can also be used to connect a pick-up tube to a side wall of the receiver housing. The attachment steps described above would also be followed in attaching the pick-up tube to the wall of the refrigerant receiver. That is, a bore with at least one counterbore is formed through the wall to receive the bead on the end of the pick-up tube. The tube is then inserted within the bore and the material on the surface surrounding the bore is deformed (staked) to secure the tube to the wall. A sharp annular edge between the counterbore and bore is forced against the junction between the bead and the end of the tube to provide a fluid-tight seal therebetween. Moreover, as discussed previously, the principles of the present invention are also applicable to attach other types of fluid tubes to an end cap or wall of other types of fluid containers. In essence, the principles of the present invention are applicable over a wide range of fluid products where a seal must be maintained between a fluid tube and a wall or cap.

Thus, as described above, the present invention provides a new and improved technique for attaching a fluid tube to an end cap or wall of a container in a fluid tight manner. The technique of the present invention requires only a single machining step, eliminates material waste associated with other techniques, and does not require an additional O-ring type seal to fluidly seal the tube to the end cap or wall.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A refrigerant assembly, comprising:
   a refrigerant housing for receiving and containing refrigerant, said housing having an open end,
   an end cap extending over and covering said open end of said housing to define a central cavity for the refrigerant, said end cap having an inner surface facing inwardly into the central cavity of the housing and an outer surface facing outwardly away from the housing, and
   a pick-up tube attached to said end cap and providing a fluid-tight seal therewith, said pick-up tube including an annular bead extending around the exterior of the tube in a direction transverse to the axis of the tube, and said end cap having an axially-extending bore formed through the end cap, said bore including a counterbore formed inwardly into the end cap from one of the inner or outer surfaces with a radius which is larger than the radius of the bore, said bore and counterbore defining an inner shoulder, said pick-up tube being received in said bore with said bead being closely received within said counterbore and engaging said inner shoulder uniformly around the circumference of the tube,
   a portion of said end cap surrounding the opening to said bore on said one surface being mechanically staked and forced into engagement with said bead so as to secure the tube to the end cap in fluid-tight relation therewith without an elastomeric seal member.

2. The assembly as in claim 1, wherein said portion of said end cap surrounding said bore is mechanically formed around the bead and at least partially encloses the bead within the counterbore.

3. The assembly as in claim 2, wherein said shoulder defines a sharp edge, said edge being forced against a concave junction between said pick-up tube and said bead to provide a fluid-tight seal.

4. The assembly as in claim 3, wherein said tube bead has a maximum outer dimension which is slip-fit within the inside dimension of the counterbore such that the tube fits closely within the counterbore.

5. The assembly as in claim 4, wherein said counterbore extends inwardly into the end cap from the inside surface of said end cap and said pick-up tube is located within said central cavity of said housing and extends axially into said bore.

6. The assembly as in claim 5, further including a second counterbore formed in said axial bore between said counterbore shoulder and said outer surface of said end cap, said second counterbore having an inner surface wall dimension which is slip-fit within the outer surface wall dimension of the pick-up tube, and said pick-up tube extends through the bore in close relation thereto such the inner distal end of the pick-up tube is at least proximate a shoulder formed by the second counterbore.

7. An assembly for providing a fluid-tight seal between a tube and a wall without an elastomeric seal member, comprising:
   a tube having a surface configuration which extends circumferentially around the exterior of the tube in a direction transverse to the axis of the tube and outwardly from the tube, and
   a wall having an axially-extending bore formed through the wall, said bore including a counterbore extending axially inward into the wall from a surface thereof with a radius which is larger than the radius of the bore, said counterbore having a slightly larger inner dimension than the outer dimension of the bead for closely receiving the bead, said bore and counterbore defining an inner shoulder with a sharp annular edge, and said tube being received in said bore with said surface configuration engaging said sharp edge of said inner shoulder uniformly around the circumference of the tube,
   a portion of said wall surface surrounding said bore being mechanically deformed without removing wall material such that said wall surface extends radially inward toward the axis of the bore to entirely encircle the tube and at least partially enclose the surface configuration within the counterbore to thereby secure the tube to the wall in a fluid-tight manner without an elastomeric seal being disposed between the tube and the wall.

8. The assembly as in claim 7, wherein said planar portion of said wall surrounding said bore is mechanically formed inward toward the axis of the bore.

9. The assembly as in claim 7, wherein said surface configuration and counterbore shoulder form a fluid-tight seal without using an elastomeric O-ring type seal.

10. The assembly as in claim 7, wherein said wall is an end cap.

11. A method for attaching a pick-up tube to an end cap of a refrigerant apparatus without using an elastomeric seal, comprising the steps of:

forming a bore axially through the end cap, said bore including a counterbore extending axially inward from one surface of the end cap with a radius larger than the bore and defining a transverse shoulder with a sharp edge, forming a bead around the circumference of the tube toward one end of the tube, inserting the pick-up tube with the formed bead axially into the bore from the one surface such that the bead of the pick-up tube engages the shoulder formed by the counterbore, and subsequently, mechanically staking the surface of the end cap around the bore in such a manner that the end cap material engages the bead to secure the pick-up tube to the end cap in a fluid tight manner without using an elastomeric seal.

12. The method as in claim 11, wherein said pick-up tube is secured to the end cap without removing material from the surface of the end cap.

13. The method as in claim 11, wherein said surface of said end cap around the bore is formed such that a portion of the end cap material entirely surrounds the bead and at least partially encloses the bead within the counterbore.

14. The method as in claim 11, wherein said step of mechanically staking the surface of the end cap comprises forcing a die into the surface of the end cap.

15. The method as in claim 14, wherein said shoulder of said counterbore defines a sharp edge, and said sharp edge cuts into a concave junction formed by the tube and the bead when the surface is mechanically staked to seal the tube to the end cap in a fluid-tight manner and said bead is maintained in a close, sliding relation with the counterbore after the surface of the end cap is mechanically staked.

16. The method as in claim 15, wherein said refrigerant apparatus comprises a refrigerant housing defining a central cavity for receiving refrigerant, said end cap covers an open end of said housing, and said surface of said end cap having said counterbore faces inwardly into said central cavity.

17. An assembly, comprising:

a tube having an annular bead extending circumferentially around the exterior of the tube in a direction transverse to the axis of the tube, a concave-shaped junction with a first radius being defined between said tube and said bead, a wall having an axially-extending bore formed through the wall, said bore including a counterbore extending axially inward into the wall from a surface thereof having a diameter which is greater than the diameter of the bore, said bore and counterbore defining an inner shoulder with a second radius, and said tube being received in said bore and said bead having a maximum outer dimension which is maintained in sliding relation with an inner dimension of the counterbore such that said bead is closely received in said counterbore, said inner shoulder engaging and indenting said junction between said tube and said bead uniformly around the circumference of the tube, a portion of said wall surface surrounding said bore engaging the bead and at least partially enclosing the bead within the counterbore to thereby secure the tube to the wall to provide a fluid-tight seal between the tube and wall without an O-ring type seal.

18. The assembly as in claim 17, wherein the wall is an end cap.

19. The refrigerant assembly as in claim 1, wherein said bead includes a surface configuration engaging said inner shoulder, said surface configuration having a radius which is greater than a radius of the inner shoulder such that the engagement of said surface configuration and said inner shoulder provides the primary fluid-tight seal between the tube and the end cap.

20. The assembly as in claim 7, wherein said surface configuration includes a radius which is greater than a radius of the inner shoulder such that the engagement of said surface configuration and said inner shoulder provides the primary fluid-tight seal between the tube and the wall.

21. The method as in claim 15, wherein said bead is slip-fit relation within said counterbore after the surface of the end cap is mechanically staked.

22. The assembly as in claim 17, wherein said first radius of said junction is greater than said second radius of said shoulder such that the engagement of said junction and said inner shoulder provides the primary fluid-tight seal between the tube and the wall.

* * * * *